United States Patent
Harr et al.

(10) Patent No.: US 7,480,667 B2
(45) Date of Patent: Jan. 20, 2009

(54) SYSTEM AND METHOD FOR USING ANCHOR TEXT AS TRAINING DATA FOR CLASSIFIER-BASED SEARCH SYSTEMS

(75) Inventors: Chen Harr, Seattle, WA (US); Adwait Ratnaparkhi, Redmond, WA (US); Sonja S. Knoll, Redmond, WA (US); Hsiao-Wuen Hon, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 403 days.

(21) Appl. No.: 11/023,856

(22) Filed: Dec. 24, 2004

(65) Prior Publication Data

US 2006/0143254 A1 Jun. 29, 2006

(51) Int. Cl.
*G06F 17/30* (2006.01)

(52) U.S. Cl. ........................ 707/101; 707/102
(58) Field of Classification Search ............... 707/1–10, 707/100–104.1, 200–206; 706/46, 47, 48; 715/277, 856; 709/217; 714/26
See application file for complete search history.

(56) References Cited

U.S. PATENT DOCUMENTS

| | | | | |
|---|---|---|---|---|
| 5,867,799 | A * | 2/1999 | Lang et al. | 707/1 |
| 6,289,353 | B1 * | 9/2001 | Hazlehurst et al. | 707/102 |
| 6,606,625 | B1 * | 8/2003 | Muslea et al. | 707/6 |
| 2003/0115189 | A1 * | 6/2003 | Srinivasa et al. | 707/3 |
| 2003/0225763 | A1 * | 12/2003 | Guilak et al. | 707/7 |
| 2004/0064464 | A1 * | 4/2004 | Forman et al. | 707/100 |
| 2005/0149504 | A1 | 7/2005 | Ratnaparkhi | 707/3 |
| 2005/0234904 | A1 * | 10/2005 | Brill et al. | 707/5 |
| 2007/0233808 | A1 * | 10/2007 | Egnor et al. | 709/217 |

OTHER PUBLICATIONS

Isabel Drost et al., "Thwarting the Nigritude Ultrmarine Learning to Identify Link Spam", Jul. 22, 2005, University of Berlin, Berlin Germany, www.cs.uni-postdam.de/ml/pubications, pp. 1-12.*
D. Craven et al., "Learning to Extract Symbolic Knowledge from the World Wild Web," Proceedings of 15th National Conference on Artificial Intelligence (AAAI-98).

* cited by examiner

*Primary Examiner*—Diane Mizrahi
(74) *Attorney, Agent, or Firm*—Christopher R. Christenson; Westman, Champlin & Kelly, P.A.

(57) ABSTRACT

A computer implemented information retrieval system is provided. The system includes a user input configured to receive a user query relative to the corpus. A machine learning classifier is trained with a first set of training data comprising anchor text relative to at least some of the documents in the corpus. A processing unit is adapted to interact with the classifier to obtain search results relative to the query using the machine learning classifier. In some aspects, the classifier is also trained with a second set of training data. A method of integrating a new document into a corpus of documents is also provided. A method of training a machine learning classifier for retrieving documents from a corpus using two distinct types of training data is also provided.

7 Claims, 4 Drawing Sheets

SYSTEM AND METHOD FOR USING ANCHOR TEXT AS TRAINING DATA FOR CLASSIFIER-BASED SEARCH SYSTEMS

FIELD OF THE INVENTION

The present invention relates in general to the field of information technology. More particularly, the present invention relates to a system and method for training classifier-based search systems.

BACKGROUND OF THE INVENTION

Search engines are now commonplace in many software applications. Search engines may be used for searching for text strings in applications such as word processors, for searching for help in sophisticated software as varied as spreadsheets and operating systems, and for searching for uniform resource locators (URLs), references and other documents in web-based search engines. The effectiveness of any one search may be abstractly judged by whether the top few returned documents are the documents actually sought by the user. The returned list should preferably be sorted by relevance to the user in the context of the search terms present in the user query and possibly the state associated with the user query. This ordering of documents makes it easier for a user to select the document that he or she believes has the greatest relevance to the search.

A search engine is generally used to provide a list of documents such that the documents have a relation to the search terms. Since sets of documents can be extremely large, and since any one search engine may have access to multiple document sets, the sheer volume of documents retrieved by search could be large. Ranking the documents according to some relevance criteria is one way to assist the user in finding the preferred document(s).

Recently, search engines have been augmented with machine learning classifiers that are able to help provide search documents with high relevance. Such classifiers are generally based on training data based on user feedback data: click patterns (i.e. "click-throughs") and/or explicit user satisfaction ratings (i.e. "explicit feedback") which indicate which documents are most relevant for a user query (and the state associated with the user query). User feedback data also includes, but is not limited to, previous user search history or the entry point of the search. Mappings between user-generated queries and the documents the user visits and/or marks as relevant are recorded. These mappings are then used to train a machine learning classifier model, that takes as input the user query (and the state associated with the user query), and produces as output a list of documents (the "classes") with associated relevance scores. Classifiers are evaluated with "test sets," generally collected from click-through and/or explicit user feedback distinct from the data used for the training set.

While this approach represents a significant improvement in the field of information retrieval, it does have one limitation. Namely, as a new document is added to the collection or corpus, it will initially have no user feedback nor click-through data associated with it. Accordingly, the machine learning classifier will not select the new document as having any relevance to a user's search. Thus, the search will either not return the new document, or may return it and place it at the bottom of a vast list of search results. While the machine learning classifier could be retrained using manual methods to better recognize the new document, such methods become prohibitively labor intensive as the number of new documents grows beyond a trivial number.

Thus, there is a continuing need for information retrieval systems that employ machine learning classifiers to automatically recognize and be trained for new documents with minimal manual intervention.

SUMMARY OF THE INVENTION

A computer implemented information retrieval system is provided. The system includes a user input configured to receive a user query relative to the corpus. A machine learning classifier is trained with a first set of training data comprising anchor text relative to at least some of the documents in the corpus. Anchor text is the text of the links or "anchors" in corpus documents to documents in the corpus. A processing unit is adapted to interact with the classifier to obtain search results relative to the query using the machine learning classifier. In some aspects, the classifier is also trained with a second set of training data. A method of integrating a new document into a corpus of documents is also provided. A method of training a machine learning classifier for retrieving documents from a corpus using two distinct types of training data is also provided.

DETAILED DESCRIPTION OF ILLUSTRATIVE EMBODIMENTS

Figure 1:
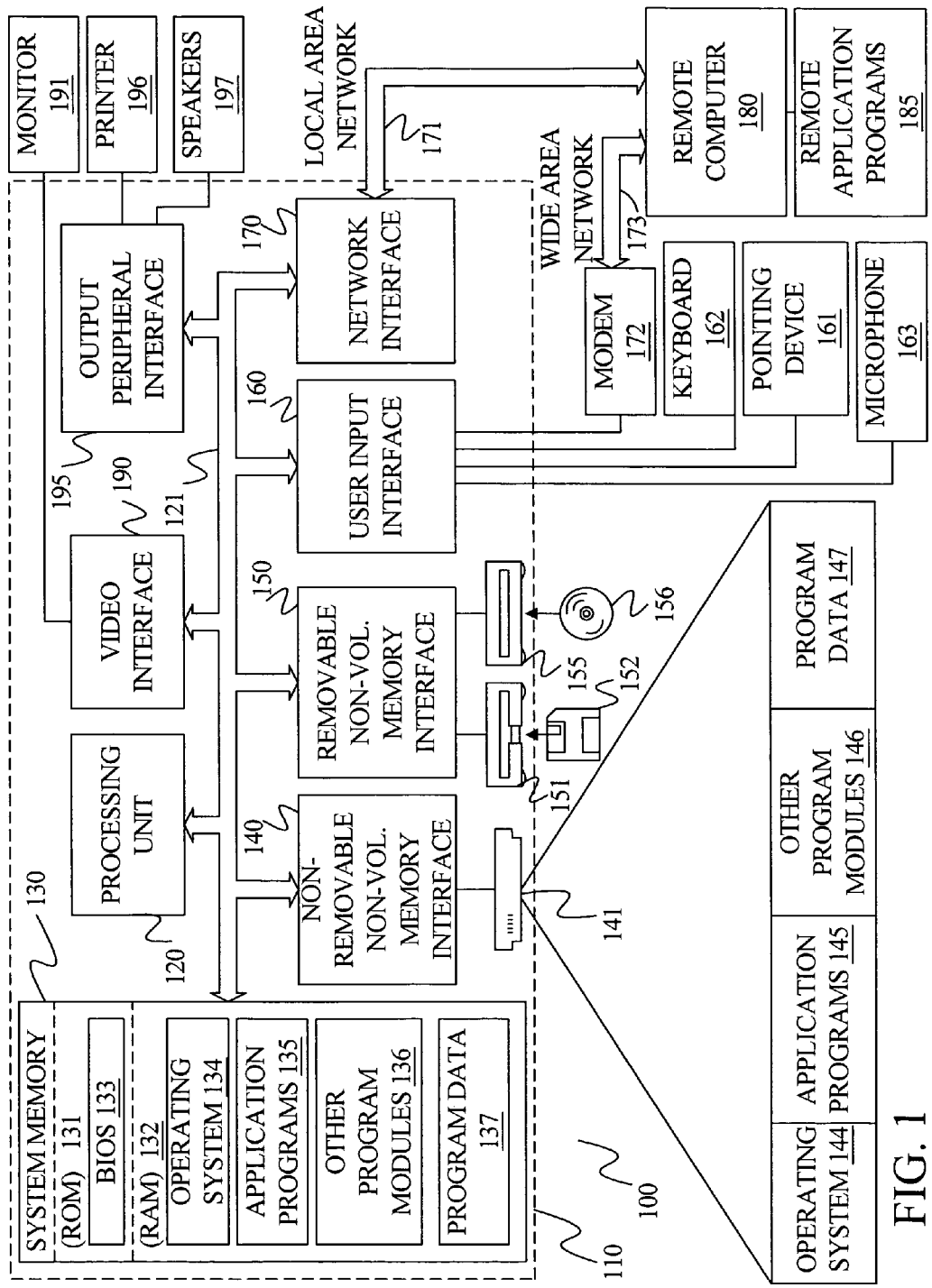
FIG. 1 is a block diagram of one computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
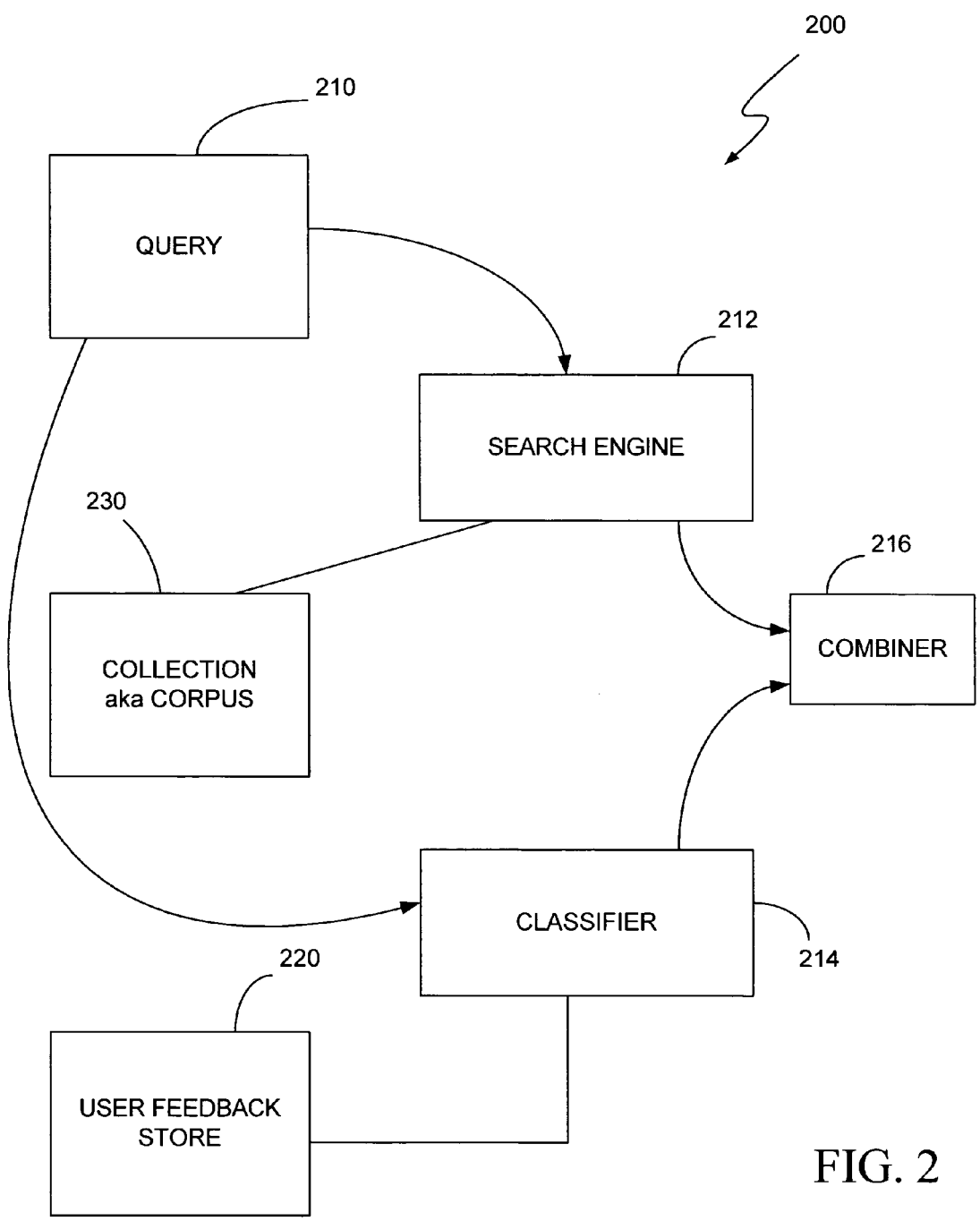
FIG. 2 is a diagrammatic view of a computer-implemented information retrieval system with which embodiments of the present invention are particularly useful.

FIG. 2 illustrates a block diagram of an exemplary information retrieval system with which embodiments of the present invention are useful. A query 210 containing a user's search terms is entered into a search engine 212. Search engine 212 processes input query 210, and then applies the search terms produced to an available document collection or corpus 230 by searching for these terms in the documents corresponding to input query 210. The returned documents may then be ranked using a ranking algorithm, such as the known OKAPI algorithm, or one of its derivatives, or known vector space-based algorithms. The ranked documents are in turn provided to the result combiner 216.

In a parallel activity, the search engine may also use a machine learning classifier 214 derived from a user feedback data store 220 to search for documents previously retrieved and selected by a user where similar search terms were used. Classifier 214 is an implementation of a machine-learning environment where user selections against a list produced in a search are used to tally the document selections against query parameters. Query click-though data is metadata obtained from previous searching sessions with the search engine. Query click-through data represents the actual selection of a document by at least one user under the conditions of a search. User feedback can include explicit feedback received from the user, or feedback that is inferred from what documents the user selects (referred to herein as "click-through"). Explicit feedback is generally obtained by recording the selection that a user makes as to which returned document is more relevant to his purposes after viewing his search results. User feedback query logs generally represent relevant sections from multiple users and can be of value in correlating search terms with documents. This correlation may be especially strong if the query logs were generated while different users were using a search tool on the same document set that issued in the document collection in any one implementation. However, this condition is not a requirement. A query log may take the form of a matrix of possible search words versus relevant documents. The intersection of the two parameters is the frequency of occurrence of the search term associated with the document. The frequency of occurrence may be the result of user click-through hits on the respective document and search term. Tabularized query click-through data is a valuable correlation of search terms and documents based on their frequency of association.

Returning to FIG. 2, the terms produced for the classifier by the search engine 212 for query 210 may be passed to the classifier 214. The classifier 214 was created offline from the user feedback data store 220. The classifier is used to search for documents containing the terms produced for this purpose by the search engine 212.

In the information retrieval context, a ranking model is an algorithm that computes the likelihood that a document containing search terms is the single document of interest. Once a likelihood is calculated and assigned to each document in a list, the entire list may be sorted according to the likelihood rankings. The resulting list is an ordered list where the document assigned the highest likelihood generally occurs first. The models used in association with the classifier 214 may include but are not limited to the maximum entropy probability model and/or the Naïve Bayes probability model. Classifier 214 then orders the list of returned query log document data according to the ranking where the highest likelihood document appears first. The lists can be combined as indicated at block 216.

In accordance with one broad aspect of the present invention, anchor text in a document corpus is extracted from some or all of the documents and used as training data for a machine learning classifier. Embodiments of the present invention are particularly useful in at least two real world situations. First, when a document is created and added to the corpus, it will, by definition, have no associated user feedback data. Anchor text can be used relative to such new documents in order to be a surrogate for the missing user feedback data. So anchor text can be used as an additional source of training data for a machine learning classifier. Accordingly, when a search system that is based on a classifier model on a corpus that includes a link structure to other documents (i.e. anchors) within and outside of the corpus, the anchor text can be leveraged as training data for the search classifier. Thus, anchor text can be used to anchor destination mappings in the same manner that query to visited documents are used.

Figure 3:
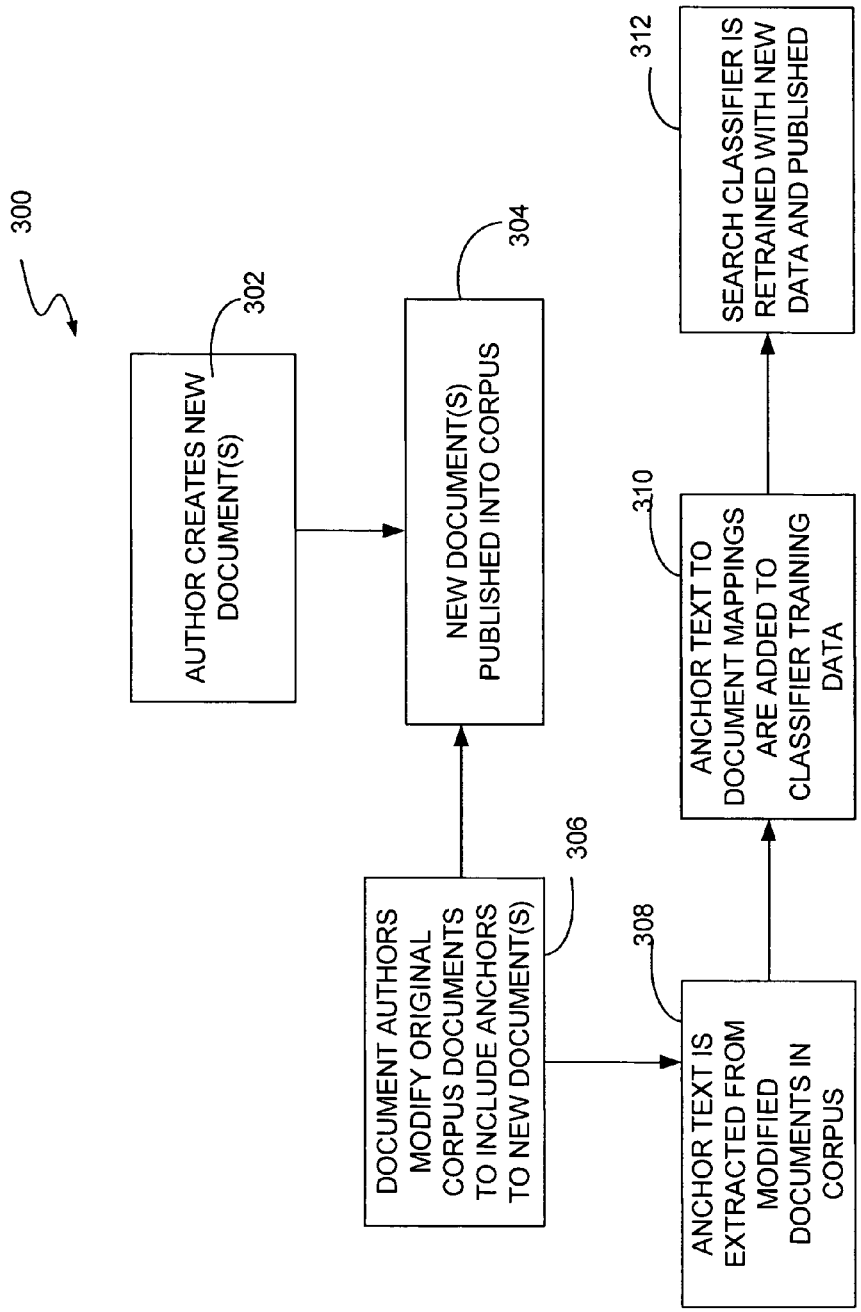
FIG. 3 is a flow diagram of a method of training a machine learning classifier in accordance with an embodiment of the present invention.

FIG. 3 is a flow diagram of a method 300 for training a machine classifier with anchor text for new documents. Method 300 begins at block 302 when an author creates a new document. As set forth above, one potential problem with classifier-based search systems that are trained on traditional user feedback data is that new documents that are published into the corpus do not have any user feedback data. Thus, they are not likely to be surfaced as a result of subsequent queries, and as such it will be difficult to collect user feedback data on them via the search system. This is a basic dilemma in that user feedback data cannot be gathered without surfacing these documents, and these documents cannot be surfaced without user feedback data. At block 306, the document author(s) modify original documents in the corpus to include anchors such as hyperlinks to the new document(s) authored in block 302. Generally, blocks 302 and 306 are done together before block 304, however block 304 can be executed twice, one time each after block 302 and block 306. At block 304, the new document created in block 302 and the modified original corpus documents from block 306 are all published into the corpus.

At block 308, anchor text is extracted from the modified documents in the corpus. The extraction of anchor text can be done automatically using programmatic algorithms that parse each document in the corpus to search for anchor text. Additionally, the anchor text can be received directly from the document author(s) when the documents are modified for publication into the corpus. In any event, a significant listing of anchor text is extracted from the corpus documents.

At block 310, the anchor text to document mappings are added to the classifier training data. This training data can also be supplemented with additional document-specific data such as title-to-document mappings. A method of combining multiple disparate types of training data in an effective manner is described more fully below with respect to FIG. 4.

At block 312, the machine learning classifier is retrained with the new training data and published. Accordingly, if the new document is referenced by other documents in the corpus by virtue their anchor text, a search that is relevant to the newly authored document may, in fact, surface the new document by virtue of the modified documents' anchor text. Thus, the new document will be surfaced faster and receive user feedback more quickly thus integrating the document and its associated relevance into the corpus more effectively.

Figure 4:
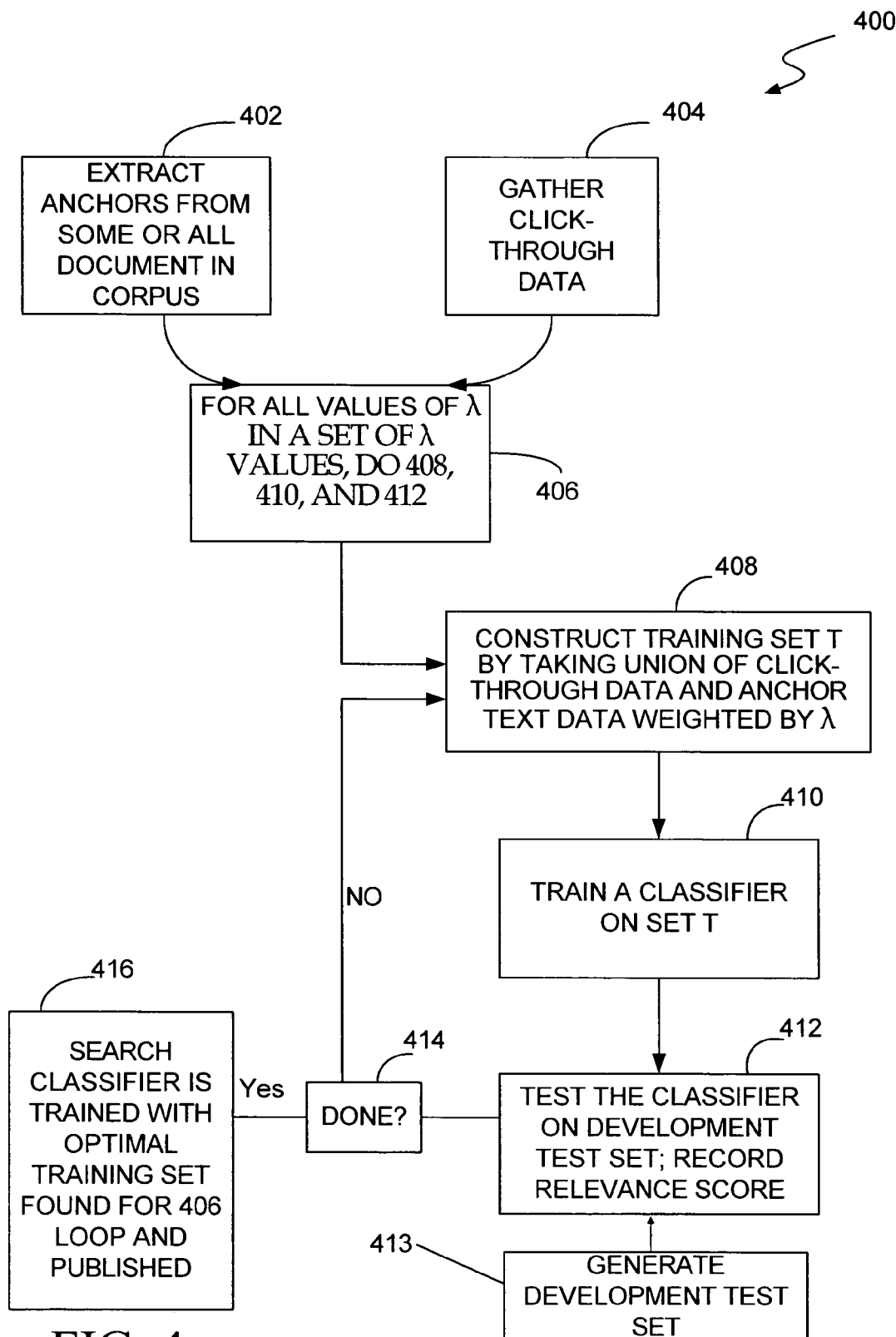
FIG. 4 is a flow diagram of a method of optimizing training of a machine learning classifier in accordance with an embodiment of the present invention.

FIG. 4 is a flow diagram of a method 400 of merging two sets of different types of training data into a single training data set for training a machine-learning classifier. For example, one type of training data is the traditional click-through data for existing documents in the corpus. Another, different type of training data is the anchor text described above with respect to FIG. 3. If these two sets of training data were naively merged, they may generate an unbalanced number of one type of data versus the other. Thus, method 400 sets forth a technique for weighing one type of data relative to the other. More specifically, if C is the set of original click-through data, and A is the set of anchor text training data, method 400 creates a combined training set T such that: $T = C \cup \lambda*A$.

In particular, most classifier trainers support specifying weights on the individual training examples. The λ weight on anchor text training is applied to all training examples in that set. Given the flexibility of the λ weight, method 400 also determines the optimal weight (i.e. finding the optimal value of λ). To do so, method 400 iteratively creates different classifiers using different values of λ and tests them against a development test set to determine which weighting value of λ provides the highest relevance. A "development test set" is a portion of the test set that is set aside for training instead of testing. A development test set can also be extracted from the training set. When this is done, the data extracted for the development test set is not used for the conventional training. Development test sets are a standard methodology in classification technology that allow for more complex training algorithms. These test sets are usually formed by using a portion of the conventional test set (thus removing it from the conventional test set). Note that the development test set and the actual test can overlap or even be the same, but they should be mutually exclusive to achieve high experimental rigor. Method 400 begins at blocks 402 and 404 where anchor text is gathered from the documents in the corpus, and the click-through data is derived from user behavior.

At block 406, an iteration is begun where for all values of λ in the set of λ values, blocks 408, 410 and 412 are performed. At block 408, the training set T is constructed by taking the union of the click-through data gathered at block 404 with the anchor text data extracted at block 402 weighted by the selected λ value for the particular iteration. At block 410, the classifier is trained with the training set T and at block 412, the classifier is tested on the development test, generated at block 413 and provided to block 412, and the relevance, or some other suitable metric of the classifier is recorded. At block 414, the method determines whether the particular value of λ for the iteration was the last value of λ in the set of λ values. If not, control returns to block 408 and the next λ value in the set of λ values is selected for the next iteration. If however, at block 414, it is determined that all λ values have been run, control passes to block 416 where the relevance scores and associated λ values are reviewed. The optimal λ value is then selected and the search classifier is trained with the optimal λ value recorded during the iterative testing of blocks 408, 410 and 412. As used herein, "optimal" means the lambda that gives highest relevance on the development test set, by some relevance measure, e.g., precision/recall. Once the search classifier is trained, it is published. While method 400 has been described with respect to combining click-through data with anchor text data, it is applicable to the combination of any two disparate type of training data for a machine learning classifiers.

Although the present invention has been described with reference to particular embodiments, workers skilled in the art will recognize that changes may be made in form and detail without departing from the spirit and scope of the invention.

What is claimed is:

1. A method of integrating a new document into a corpus of documents, the corpus of documents being a collection of documents the method comprising:
generating the new document;
modifying at least one existing document in the corpus to have anchor text relating to the new document;
automatically training a machine learning classifier using a union of a first set of training data including at least the anchor text and a second set of training data relative to the corpus of documents wherein at least one of the first and second training sets is weighted with the same weight being applied to all set members; and
publishing the new document and the at least one modified document.

2. A computer-implemented method of training a machine learning classifier for retrieving documents from a corpus, the method comprising:
extracting a first set of training data relative to at least some of the documents in the corpus;
extracting a second set of training data relative to at least some of the documents in the corpus;
generating a combined training set as the union of one, first set of training data and the second set of training data and a weighted other of the first and second training sets wherein the same weight is applied to all members of the weighted other of the first and second training sets, wherein the first and second sets of training data are of different types of data; and
automatically training the machine learning classifier with the combined training set.

3. The method of claim 2, wherein the first set of training data comprises anchor text relative to at least some of the documents.

4. The method of claim 3, wherein the second set of training data comprises clickthrough data relative to at least some of the documents.

5. The method of claim 2, wherein the second set of training data comprises clickthrough data relative to at least some of the documents.

6. The method of claim 2, and further comprising iterating the method with different weight values and recording an accuracy measure of the classifier using a development test set for each weight value.

7. The method of claim 6, and further comprising selecting a weight value that produced the highest relevance score, and training the machine learning classifier using that weight.

* * * * *